United States Patent
Salter et al.

(10) Patent No.: US 8,547,017 B2
(45) Date of Patent: Oct. 1, 2013

(54) VEHICLE DOME AND READING LIGHT

(75) Inventors: Stuart C. Salter, White Lake, MI (US); Cornel Lewis Gardner, Romulus, MI (US); Jeffrey Singer, Canton, MI (US); Megan Lovejoy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 13/107,541

(22) Filed: May 13, 2011

(65) Prior Publication Data
US 2012/0286661 A1   Nov. 15, 2012

(51) Int. Cl.
*B60Q 1/14*   (2006.01)
*B60Q 3/02*   (2006.01)

(52) U.S. Cl.
USPC .............................................. 315/77; 315/84

(58) Field of Classification Search
None
See application file for complete search history.

(56) References Cited

U.S. PATENT DOCUMENTS

| | | | |
|---|---|---|---|
| 4,878,107 A | 10/1989 | Hopper | |
| 6,713,967 B1* | 3/2004 | Gaynier et al. | 315/77 |
| 6,935,763 B2 | 8/2005 | Mueller et al. | |
| 7,615,939 B2* | 11/2009 | Halter | 315/307 |
| 2007/0171037 A1* | 7/2007 | Schofield et al. | 340/438 |
| 2008/0062706 A1 | 3/2008 | Feldmeier | |
| 2008/0259627 A1* | 10/2008 | Salter et al. | 362/511 |
| 2011/0006684 A1* | 1/2011 | Hodgson et al. | 315/77 |

FOREIGN PATENT DOCUMENTS

FR   2870612   11/2005

* cited by examiner

*Primary Examiner* — Crystal L Hammond
(74) *Attorney, Agent, or Firm* — Vichit Chea; Price Heneveld LLP

(57) ABSTRACT

A vehicle dome and reading light assembly for a vehicle includes a lighting device assembled to the interior of the vehicle and capable of generating plural light colors. A first switch is actuatable to cause the lighting device to generate a first color light and a first light intensity to serve as a dome lamp. A second switch is actuatable to cause the lighting device to generate a second color light at a second light intensity to serve as a map or reading lamp.

17 Claims, 2 Drawing Sheets

VEHICLE DOME AND READING LIGHT

FIELD OF THE INVENTION

The present invention generally relates to vehicle lighting, and more particularly relates to vehicle interior dome and map/reading lights.

BACKGROUND OF THE INVENTION

Automotive vehicles, such as wheeled vehicles, are commonly equipped with a plurality of interior lighting devices for illuminating the passenger compartment. For example, automotive vehicles typically include a dome lamp for providing light illumination when one or more vehicle doors are open to provide ambient lighting for occupants of the vehicle to move in and out of the vehicle. Additionally, automotive vehicles are commonly equipped with a plurality of reading or map lamps that provide ambient lighting to enable passengers to read, view maps, and otherwise aid in vision. Some vehicles employ a reading or map light to serve also as the dome light which provides one light color at one light intensity for both lighting applications. Unfortunately, the map light intensity and color of the light output often is not optimum for reading or map viewing. It is therefore desirable to provide for an enhanced lighting system that allows for dome and map/reading lamps that are satisfactory for passengers in the vehicle.

SUMMARY OF THE INVENTION

According to one aspect of the present invention, a vehicle dome and reading light assembly is provided. The light assembly includes a lighting device assembled to the interior of a vehicle and capable of generating plural light colors. The light assembly also includes a first switch actuatable to cause the lighting device to generate a first color light at a first light intensity to serve as a dome light. The light assembly further includes a second switch actuatable to cause the lighting device to generate a second color light at a second light intensity to serve as a reading light.

According to another aspect of the present invention, a vehicle dome and reading light assembly is provided. The light assembly is assembled to the interior of a vehicle to serve as a dome light and a reading light. The lighting assembly includes a first switch actuatable to cause the lighting device to generate a first light at a first light intensity to serve as the dome light. The light assembly further includes a second switch actuatable to cause the lighting device to generate a second light at a second light intensity to serve as the reading light.

According to a further aspect of the present invention, a method of controlling a light assembly in a vehicle to provide dome and reading lights is provided. The light assembly generates with the lighting device a first color light at a first light intensity to serve as the dome light and generates with the lighting device a second color light at a second light intensity to serve as the reading light.

These and other aspects, objects, and features of the present invention will be understood and appreciated by those skilled in the art upon studying the following specification, claims, and appended drawings.

DETAILED DESCRIPTION OF PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design: some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
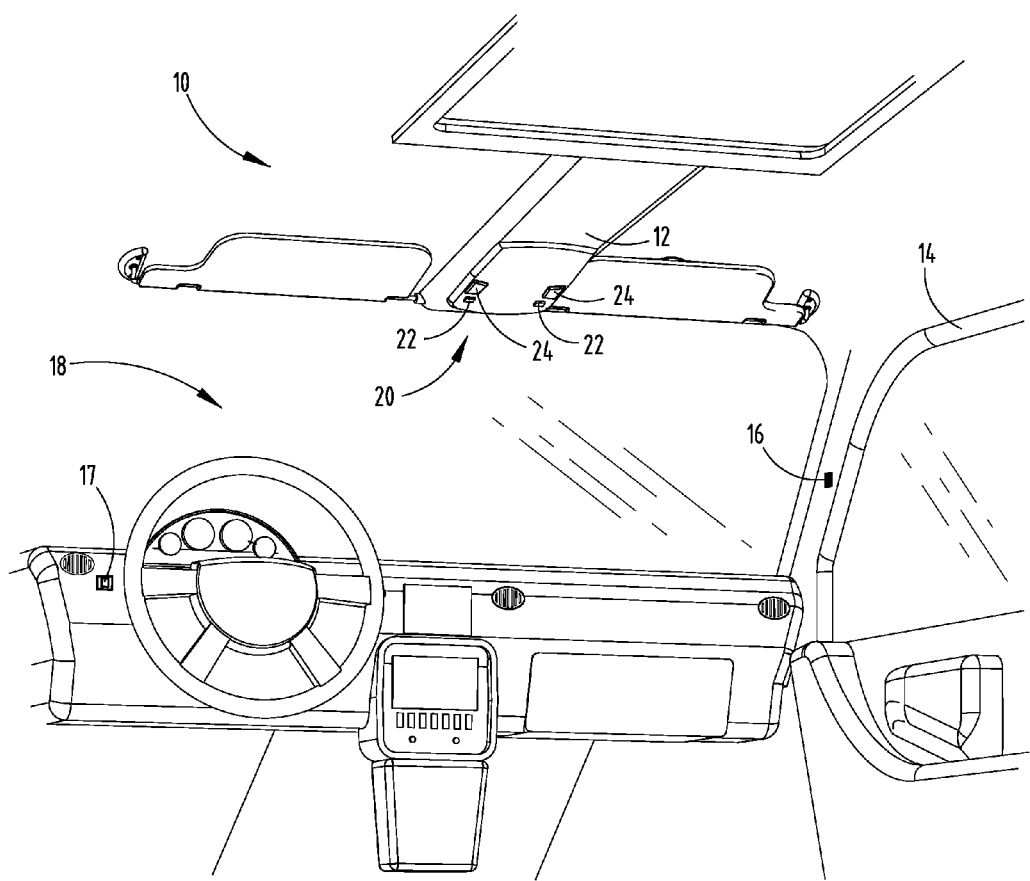
FIG. 1 is a schematic diagram of an overhead console having a pair of dome/reading light assemblies that may be employed according to one embodiment of the present invention.

Referring to FIG. 1, the passenger compartment 18 of an automotive vehicle 10 is generally illustrated having a light assembly 20, according to one embodiment. The vehicle 10 generally includes an overhead console 12 assembled to the interior side of the roof or ceiling of the passenger compartment 18, generally above the front passenger seating area. The vehicle 10 also includes side doors, such as door 14 which open and close to allow entry into and exit from the vehicle 10. Each door 14 may operatively engage a dome light input switch 16 which switches state based on whether the door 14 is in the open or closed position. Additionally, a dash mounted switch 17 may be provided on the dashboard or elsewhere and is generally accessible to the driver of the vehicle 10 for controlling lights, including turning on and off one or more dome lights.

The light assembly 20 provides for both dome and reading lights (lamps) within the interior of the passenger compartment 18 of the vehicle 10. The term dome lamp is recognized in the vehicle interior lighting art as a light that provides general ambient lighting. The term reading light is interchangeable with the term map light, and both terms are known in the art for providing light to enable passengers to read and view maps. The dome light and the map or reading light output different light colors at different light intensities as described herein. The difference in color of light generated by the dome light and the map or reading light may have a different hue, saturation, and/or color lightness (or value). The difference in intensity of the light output by the dome light and map or reading light has a different brightness.

In the embodiment shown, the light assembly 20 includes at least one lighting device 24 assembled to the interior of the vehicle 10 and capable of generating plural light colors. In the embodiment shown, two lighting devices 24 are assembled to the overhead console 12 generally at a central location above the forward seated passenger area sufficient to provide both dome and reading lights. The two light devices 24 include a first lighting device 24 generally oriented towards the driver side of the passenger compartment 18 and a second lighting device 24 generally oriented towards a front seat passenger side of the passenger compartment 18. It should be appreciated that one or more lighting devices 24 may be assembled at other locations on board the vehicle 10.

The light assembly 20 includes a first switch actuatable to cause the lighting device(s) 24 to generate a first color light at a first light intensity to serve as a dome lamp. In the embodiment shown, each of the door mounted switches 16 and the dash mounted switch 17 may serve as the first switch which may be actutable to cause the lighting device 24 to generate a first color light at a first light intensity to serve as a dome lamp. For example, when a vehicle door 14 is open, switch 16 detects the open door and causes the lighting device(s) 24 to generate the first color light at the first light intensity to serve as the dome lamp. The dash mounted switch 17 also enables the driver of the vehicle 10 or other passenger to turn on the lighting device(s) 24 manually to provide dome lighting as is known in the art. In the embodiment shown, both lighting devices 24 turn on to serve as dome lights, however, it should be appreciated that one or more lighting devices 24 may serve as the dome light. It should also be appreciated that other switches at other locations may be employed to cause the lighting device to generate a first color light at a first light intensity to serve as the dome lamp.

The light assembly 20 also includes a second switch actuatable to cause one of the lighting device(s) 24 to generate a second color light at a second light intensity so as to serve as a map or reading lamp. In the embodiment shown, the second switch is provided by a pair of switches 22 assembled to the overhead console 12, in close proximity to the corresponding pair of lighting devices 24. A user may actuate one of the second switches 22 to cause the corresponding lighting device 24 to generate a second color light at a second light intensity to serve as a reading lamp. As a reading lamp, the lighting device 24 illuminates the area generally toward one side of the vehicle 10 to enable reading and map viewing by one or more passengers as is known in the art. The first lighting device 24 provides map lighting for the driver of the vehicle and the second lighting device 24 provides map lighting for the passengers. In the embodiment shown, two lighting devices 24 are shown, each activated by a designated switch 22 to provide a map/reading light, however, it should be appreciated that one or more light devices 24 may serve as map/reading lights.

Figure 2:
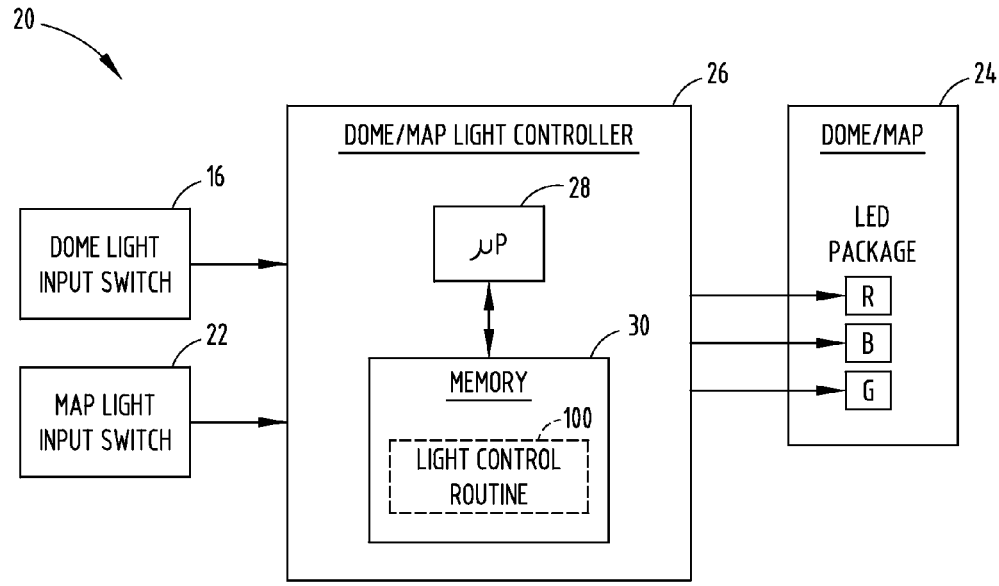
FIG. 2 is a block diagram illustrating the vehicle lighting assembly for providing dome and reading lighting, according to one embodiment of the present invention.

The light assembly 20 is further illustrated in FIG. 2 having a dome/map light controller 26 receiving inputs from each of the dome light input switches 16 and 17 and map light input switch 22 and controlling a light device 24. The light controller 26 may include control circuitry such as a microprocessor 28 and memory 30. A light control routine 100 is shown stored within memory and executable by the microprocessor 28 to provide control of the lighting device 24, according to one embodiment. The lighting device 24 may include a light emitting diode (LED) package, according to one embodiment. More specifically, the LED package may include a plurality of LEDs of different light output colors, such as a red LED (R), a blue LED (B), and a green LED (G). By controlling the mix and proportion of light colors provided by each of the red, blue and green LEDs of the LED package, various light color outputs and light intensities may be achieved. The light controller 26 processes the dome light inputs 16 and 17 and map light input(s) 22 and generates pulse width modulated (PWM) signals provided to each diode of the dome/map LED package 24 to generate the resultant light color and light intensity.

Accordingly, the light device 24 advantageously serves as both a dome lamp and a map/reading lamp and provides discernable light color and light intensity for each use. While functioning as a dome lamp, the light device 24 outputs a first light color at a first intensity. When functioning as a map or reading lamp, the light device 24 outputs a different second color at a different second intensity. In one embodiment, the second intensity color is higher or brighter than the first intensity color so as to provide an enhanced brightness reading light. The dome lamp may provide a warmer yellowish-white color light illumination that creates a more inviting interior appearance at a lower intensity or brightness so that there is a lower relative contrast between illuminated and non-illuminated areas of the passenger compartment 18 while providing enough light to enter/exit the vehicle 10. When used as a reading lamp, the light device 24 provides a much higher intensity or brightness and a cooler bluish-white color light illumination that provides enhanced clarity to serve as a reading lamp for viewing text, maps and other printed material and objects in a manner that enables a passenger to clearly see fine detail.

In one embodiment, the light device 24 may employ a warm white color LED and may change light color output by turning on a blue color LED to shift the combined light in a cooler bluish-white color direction. In doing so, pulse width modulation (PWM) may be used to change the light intensity (brightness) between low to high intensities, according to one embodiment. According to another embodiment, current control may be employed to shift the light intensity.

According to another embodiment, the light device 24 may employ an LED package including red, green and blue color diodes. The red, green and blue light colors output from the individual diodes may be mixed to achieve the required light color and intensity. In this embodiment, pulse width modulation may also be employed to change between low to high intensities or current control may be employed to shift the intensity of the light output.

Figure 3:
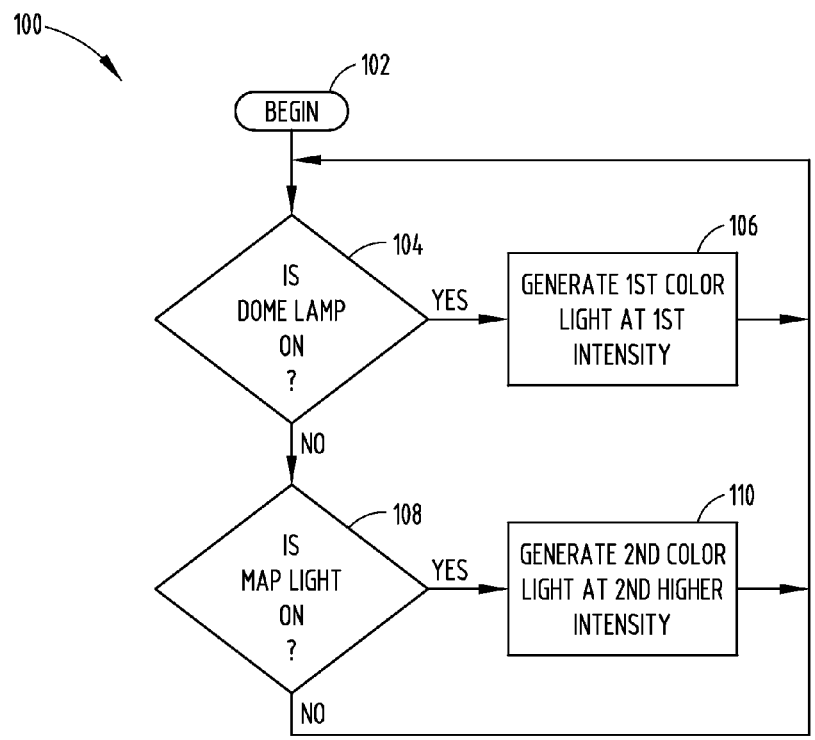
FIG. 3 is a flow diagram illustrating a light control routine for controlling illumination of the light assembly, according to one embodiment.

The light control routine 100 is illustrated in FIG. 3, according to one embodiment. Routine 100 begins at step 102 and proceeds to decision step 104 to check whether a dome lamp switch is actuated to turn on the dome light. If the dome lamp switch is actuated by either a door mounted switch 16 or dash mounted switch 17, then routine 100 proceeds to step 106 to generate a first color light at a first light intensity. Routine 100 also checks for whether the map light switch is turned on by actuation of switch 22. If the map light is turned on, routine 100 generates a second color light at a higher second light intensity (brightness) to provide a map or reading light. Accordingly, routine 100 advantageously controls the light color and light intensity of the light device 24 to provide either dome or map/reading lights within the interior of the vehicle 10.

Accordingly, the vehicle dome and reading light assembly 20 and method advantageously provides for optimum lighting for both dome and map/reading lights within the interior of the vehicle 10. The light assembly 20 allows for a single lighting device 24 to provide both a first color light at a first intensity light to serve as the dome lamp and a second color light at a second higher intensity to provide optimal lighting for reading and map viewing. Accordingly, the use of separate map and dome lamps is eliminated and enhanced lighting is provided by the combined function light assembly package.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle dome and reading light assembly comprising;
a lighting device assembled to the interior of a vehicle and capable of generating plural light colors;
a first switch actuatable to cause the lighting device to generate a first color light at a first light intensity to serve as a dome light; and
a second switch actuatable to cause the lighting device to generate a second color light at a second light intensity to serve as a reading light.

2. The light assembly of claim 1, wherein the lighting device comprises an LED package.

3. The light assembly of claim 2, wherein the LED package comprises a plurality of LEDs of different colors.

4. The light assembly of claim 3, wherein the plurality of LED of plural colors comprises a red, green, and blue LED.

5. The light assembly of claim 1, wherein the first color is a yellowish white and the second color is a bluish white.

6. The light assembly of claim 1, wherein the lighting device comprises a white light and a bluish light, wherein the first color comprises the white light and the second color comprises a mix of the white light and bluish light.

7. The light assembly of claim 1, wherein the first intensity is provided with a first pulse width modulation and the second intensity is provided at a second pulse width modulation.

8. A vehicle dome and reading light assembly comprising:
   a lighting device assembled to the interior of a vehicle to serve as a dome light and a reading light;
   a first switch actuatable to cause the lighting device to generate a first light at a first light intensity to serve as the dome light; and
   a second switch actuatable to cause the lighting device to generate a second light at a second light intensity to serve as the reading light.

9. The light assembly of claim 8, wherein the first light has a first color and the second light has a different second color.

10. The light assembly of claim 9, wherein the lighting device comprises an LED package comprising a plurality of different colors.

11. The light assembly of claim 9, wherein the first color is a yellowish white and the second color is a bluish white.

12. The light assembly of claim 9, wherein the lighting device comprises a white light and a bluish light, wherein the first color comprises the white light and the second color comprises a mix of the white light and bluish light.

13. The light assembly of claim 8, wherein the first intensity is provided with a first pulse width modulation and the second intensity is provided with a second pulse width modulation.

14. A method of controlling a light assembly in a vehicle to provide dome and reading lights, said method comprising:
   generating with a lighting device a first color light at a first light intensity to serve as the dome light; and
   generating with the lighting device a second color light at a second light intensity to serve as the reading light.

15. The method of claim 14, wherein the step of generating the first light intensity comprises providing a first pulse width modulation to the lighting device, and the step of generating a second light intensity comprises providing a second pulse width modulation to the lighting device.

16. The method of claim 14, wherein the step of generating a first color comprises generating a white light and the step of generating a second color comprises providing a mix of white light and bluish light.

17. The method of claim 14, wherein the step of generating a first color comprises generating a yellowish white light and the step of generating a second color comprises generating a bluish white light.

* * * * *